(12) United States Patent
Sun et al.

(10) Patent No.: US 11,306,923 B2
(45) Date of Patent: Apr. 19, 2022

(54) INTRA-DAY ROLLING SCHEDULING METHOD FOR INTEGRATED HEAT AND ELECTRICITY SYSTEM

(71) Applicant: Tsinghua University, Beijing (CN)

(72) Inventors: Hongbin Sun, Beijing (CN); Qinglai Guo, Beijing (CN); Bin Wang, Beijing (CN); Yuwei Chen, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 133 days.

(21) Appl. No.: 16/842,566

(22) Filed: Apr. 7, 2020

(65) Prior Publication Data

US 2020/0232654 A1    Jul. 23, 2020

Related U.S. Application Data

(63) Continuation of application No. PCT/CN2017/114465, filed on Dec. 4, 2017.

(30) Foreign Application Priority Data

Oct. 22, 2017   (CN) .......................... 201710989015.9

(51) Int. Cl.
    *F24D 19/10*      (2006.01)
    *G05B 17/02*      (2006.01)
    (Continued)

(52) U.S. Cl.
    CPC ......... *F24D 19/1006* (2013.01); *G05B 17/02* (2013.01); *G06Q 10/0631* (2013.01);
    (Continued)

(58) Field of Classification Search
    None
    See application file for complete search history.

(56) References Cited

U.S. PATENT DOCUMENTS

| | | | | |
|---|---|---|---|---|
| 6,021,402 A | * | 2/2000 | Takriti | G06Q 50/06 705/412 |
| 2008/0077368 A1 | * | 3/2008 | Nasle | G05B 17/02 703/4 |
| 2012/0010757 A1 | * | 1/2012 | Francino | H02J 3/14 700/291 |

FOREIGN PATENT DOCUMENTS

| CN | 105046395 A | 11/2015 |
|---|---|---|
| CN | 106056251 A | 10/2016 |

OTHER PUBLICATIONS

Office Action for CN Application No. 201710989015.9, dated Apr. 25, 2019.

(Continued)

*Primary Examiner* — Mohammad Ali
*Assistant Examiner* — Saad M Kabir
(74) *Attorney, Agent, or Firm* — Hodgson Russ LLP

(57) ABSTRACT

An intra-day rolling scheduling method for an integrated heat and electricity system including: establishing an objective function for scheduling of the integrated heat and electricity system, the objective function aiming to make operating costs of the integrated heat and electricity system to be a minimum; establishing constraints for a steady-state safe operation of the integrated heat and electricity system; and solving the objective function based on the constraints by an interior point method, to obtain an active power and a heating power of each combined heat and power unit, an active power of each thermal power unit, a heating power of each heat pump, and an active power consumed by each circulating pump.

12 Claims, 1 Drawing Sheet

(51) Int. Cl.
*G06Q 10/06* (2012.01)
*G06Q 50/06* (2012.01)
*H02J 3/00* (2006.01)

(52) U.S. Cl.
CPC ............... *G06Q 50/06* (2013.01); *H02J 3/00* (2013.01); *H02J 2203/20* (2020.01)

(56) References Cited

OTHER PUBLICATIONS

Wind Power Accommodation Low-Carbon Economic Dispatch Considering Heat Accumulator and Carbon Capture Devices, Lu Zhigang et al., Journal of Electrical Technology, vol. 31, No. 17, pp. 41-51, Dated Sep. 30, 2016.

\* cited by examiner

INTRA-DAY ROLLING SCHEDULING METHOD FOR INTEGRATED HEAT AND ELECTRICITY SYSTEM

CROSS-REFERENCE TO RELATED APPLICATION

This is a continuation of International Application No. PCT/CN2017/114465 filed Dec. 4, 2017, which claims priority to Chinese Patent Application No. 201710989015.9, filed Oct. 22, 2017, the entire disclosures of which are incorporated herein by reference.

FIELD

The present disclosure relates to an intra-day rolling scheduling method for an integrated heat and electricity system, belongs to the field of operation and control technologies for a power grid with a plurality of energy forms.

BACKGROUND

The multi-energy system may include a plurality of energy flow subsystems. The energy may refer to such as electricity, heat, cold, gas, or transportation. The multi-energy system has considerable benefits, such as reducing energy consumption, improving overall energy efficiency, and reducing total energy costs, but improves the control complex.

The integrated heat and electricity system is one of the multi-energy systems. The integrated heat and electricity system may include a power grid and a heating network, in which coupling components such as combined heat and power units, heat pumps, and circulating pumps may couple the power grid and the heating network. However, there coupling components bring about new requirements on operation and control on the integrated heat and electricity system, such as the intra-day rolling scheduling on the integrated heat and electricity system needs to consider these coupling components comprehensively.

SUMMARY

The intra-day rolling scheduling method for the integrated heat and electricity system, provided by the present disclosure, may include the following: establishing an objective function for scheduling of the integrated heat and electricity system, the objective function aiming to make operating costs of the integrated heat and electricity system to be a minimum, the integrated heat and electricity system comprising combined heat and power units, thermal power units, heat pumps, and circulating pump; establishing constraints for a steady-state safe operation of the integrated heat and electricity system; and solving the objective function based on the constraints by an interior point method, to obtain an active power and a heating power of each combined heat and power unit, an active power of each thermal power unit, a heating power of each heat pump, and an active power consumed by each circulating pump, as an intra-day rolling scheduling scheme of the integrated heat and electricity system.

DETAILED DESCRIPTION

Figure 1:
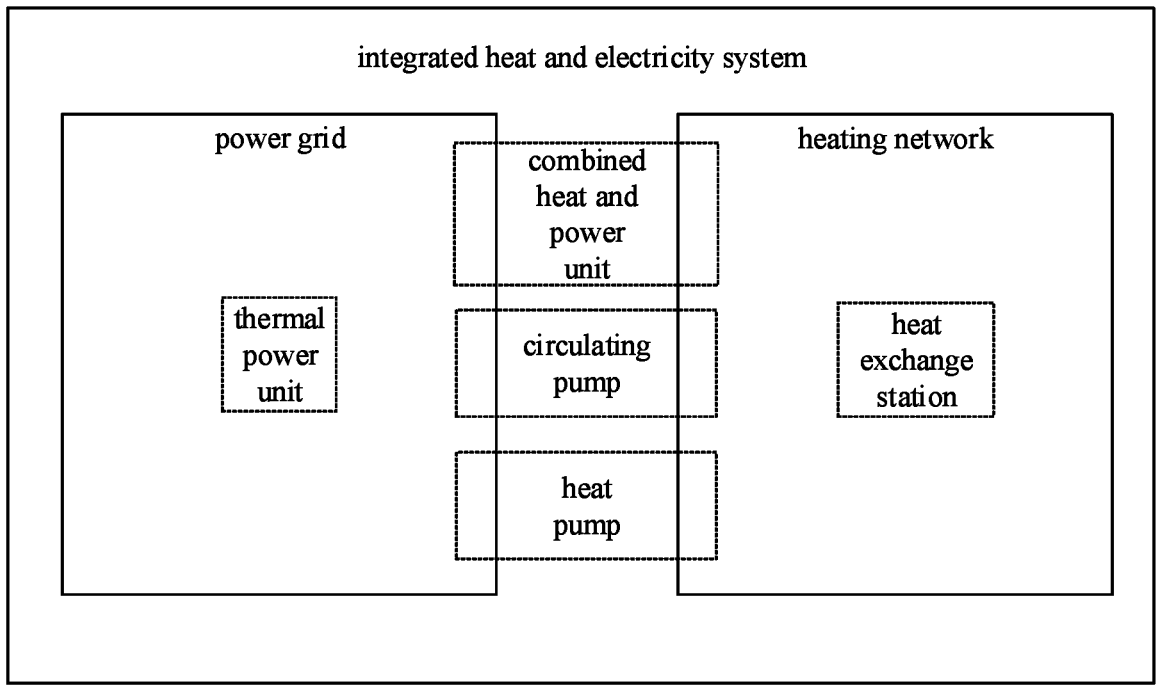
FIG. 1 is a block diagram of an integrated heat and electricity system according to an embodiment of the present disclosure.
Figure 2:
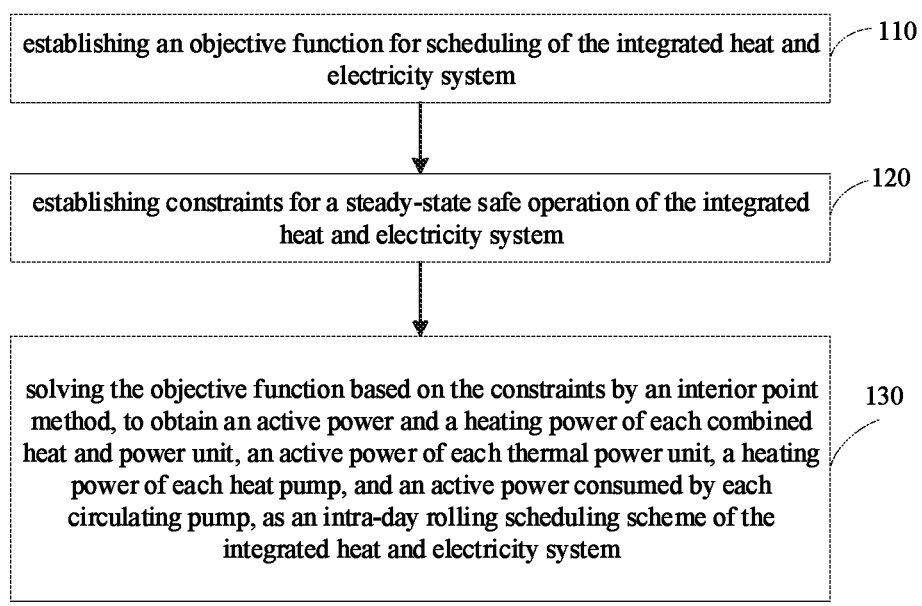
FIG. 2 is a flowchart of an intra-day rolling scheduling method for an integrated heat and electricity system according to an embodiment of the present disclosure.

The integrated heat and electricity system is shown in FIG. 1. The integrated heat and electricity system may include a power grid and a heating network. Coupling components such as combined heat and power units, heat pumps, and circulating pumps may couple the power grid and the heating network.

The intra-day rolling scheduling method for the integrated heat and electricity system, provided by the present disclosure, may include: establishing (110) an objective function for scheduling of the integrated heat and electricity system, the objective function aiming to make operating costs of the integrated heat and electricity system to be a minimum, the integrated heat and electricity system comprising combined heat and power units, thermal power units, heat pumps, and circulating pump; establishing (120) constraints for a steady-state safe operation of the integrated heat and electricity system; and solving (130) the objective function based on the constraints by an interior point method, to obtain an active power and a heating power of each combined heat and power unit, an active power of each thermal power unit, a heating power of each heat pump, and an active power consumed by each circulating pump, as an intra-day rolling scheduling scheme of the integrated heat and electricity system.

In detail, the intra-day rolling scheduling method for the integrated heat and electricity system, provided by the present disclosure, may include the following steps.

(1) An objective function for optimal scheduling of the integrated heat and electricity system may be established by a formula of:

$$\min \sum_{t=1}^{16} \left( \sum_{b=1}^{N} F(p_{b,t}, q_{b,t}) + \sum_{x=1}^{N_{TU}} F_{TU}(p_{x,t}) \right) \Delta t,$$

where, $p_{b,t}$ represents an active power of a $b^{th}$ combined heat and power unit in the integrated heat and electricity system at a $t^{th}$ scheduling period, $q_{b,t}$ represents a heating power of the $b^{th}$ combined heat and power unit in the integrated heat and electricity system at the $t^{th}$ scheduling period, N represents a number of combined heat and power units in the integrated heat and electricity system, $F(p_{b,t},q_{b,t})$ represents a running cost of the $b^{th}$ combined heat and power unit in the integrated heat and electricity system at the $t^{th}$ scheduling period, $p_{x,t}$ represents an active power of an $x^{th}$ thermal power unit in the integrated heat and electricity system at the $t^{th}$ scheduling period, $N_{TU}$ represents a number of thermal power units in a power grid in the integrated heat and electricity system, $F_{TU}(p_{x,t})$ represents a running cost of the $x^{th}$ thermal power unit in the power grid in the integrated heat and electricity system, $\Delta t$ represents an interval between two neighboring scheduling periods, and a value of $\Delta t$ is 15 minutes.

(2) Equality constraints for a steady-state safe operation of the power grid and the heating network in the integrated heat and electricity system may be set, which may include the following.

(2-1) A power flow constraint of the power grid in the integrated heat and electricity system is denoted by formulas of:

$$P_{i,t} = U_{i,t} \sum_{j \in i} U_{j,t}(G_{ij}\cos(\theta_{i,t} - \theta_{j,t}) + B_{ij}\sin(\theta_t - \theta_{j,t})),$$

$$i, j = 1, 2, \ldots n, t = 1, 2, \ldots, 16$$

$$Q_{i,t} = U_{i,t} \sum_{j \in i} U_{j,t}(G_{ij}\sin(\theta_{i,t} - \theta_{j,t}) - B_{ij}\cos(\theta_{i,t} - \theta_{j,t})),$$

$$i, j = 1, 2, \ldots n, t = 1, 2, \ldots, 16,$$

where, $P_{i,t}$ represents an injected active power of a $i^{th}$ node of the power grid in the integrated heat and electricity system at the $t^{th}$ scheduling period, $Q_{i,t}$ represents an injected reactive power of the $i^{th}$ node of the power grid in the integrated heat and electricity system at the $t^{th}$ scheduling period, $\theta_{i,t}$ represents a voltage phase angle of the $i^{th}$ node at the $t^{th}$ scheduling period, $\theta_{j,t}$ represents a voltage phase angle of the $j^{th}$ node at the $t^{th}$ scheduling period, $U_{i,t}$ represents a voltage amplitude of the $i^{th}$ node at the $t^{th}$ scheduling period, $U_{j,t}$ represents a voltage amplitude of the $j^{th}$ node at the $t^{th}$ scheduling period, $G_{ij}$ represents a real part of an element at $i^{th}$ row and $j^{th}$ column in a node admittance matrix Y of the power grid, $B_{ij}$ represents an imaginary part of the element at $i^{th}$ row and $j^{th}$ column in the node admittance matrix Y of the power grid, the node admittance matrix Y of the power grid is obtained from an energy management system of the integrated heat and electricity system, and n represents a number of nodes of the power grid.

(2-2) A pipe pressure loss constraint of the heating network in the integrated heat and electricity system is denoted by a formula of:

$$\Delta H_{l,t} = S_l m_{l,t} |m_{l,t}|, t=1,2,\ldots,16,$$

where, $\Delta H_{l,t}$ represents a pressure loss of a $l^{th}$ pipe of the heating network in the integrated heat and electricity system at the $t^{th}$ scheduling period, $S_l$ represents a resistance characteristic coefficient, a range of $S_l$ is 10 Pa/(kg/s)$^2 \leq S_l \leq 500$ Pa/(kg/s)$^2$, and $m_{l,t}$ represents a mass flow rate of the $l^{th}$ pipe at the $t^{th}$ scheduling period.

(2-3) A hydraulic characteristic constraint of a circulating pump of the heating network in the integrated heat and electricity system is denoted by a formula of:

$$H_{P,t} = H_0 - S_p m_{P,t}^2, t=1,2,\ldots,16,$$

where, $H_{P,t}$ represents a head of delivery of the circulating pump at the $t^{th}$ scheduling period, $H_0$ represents a static head of delivery of the circulating pump, $S_p$ represents a resistance coefficient of the circulating pump, $H_0$ and $S_p$ are obtained from a factory manual of the circulating pump, and $m_{P,t}$ represents a mass flow rate that flowing through the circulating pump at the $t^{th}$ scheduling period.

(2-4) A pipe heating loss constraint of the heating network in the integrated heat and electricity system is denoted by a formula of:

$$T_{e,l,t} = (T_{h,l,t} - T_{a,l,t})e^{-\frac{\lambda L_l}{C_p m_{l,t}}} + T_{a,l,t}, t = 1, 2, \ldots, 16,$$

where, $T_{e,l,t}$ represents a tail-end temperature of the $l^{th}$ pipe of the heating network at the $t^{th}$ scheduling period, $T_{h,l,t}$ represents a head-end temperature of the $l^{th}$ pipe at the $t^{th}$ scheduling period, $T_{a,l,t}$ represents an ambient temperature of the $l^{th}$ pipe at the $t^{th}$ scheduling period, $m_{l,t}$ represents the mass flow rate of the $l^{th}$ pipe at the $t^{th}$ scheduling period, $L_l$ represents a length of the $l^{th}$ pipe, $C_p$ represents a specific heat capacity of water, a value of the specific heat capacity is 4182 Joules/(kg·° C.), $\lambda$ represents a heat transfer coefficient per unit length of the pipe, $\lambda$ is obtained from the energy management system of the integrated heat and electricity system, and e represents a natural logarithm.

(2-5) A temperature constraint of a junction node of a plurality of pipes of the heating network in the integrated heat and electricity system is denoted by a formula of:

$$\left(\sum_{l \in S_n^{out}} m_{l,t}\right) T_{h,l,t} = \sum_{l \in S_n^{in}} m_{l,t} T_{e,l,t} - Q_{J,n,t}, t = 1, 2, \ldots, 16,$$

where, $m_{l,t}$ represents the mass flow rate of the $l^{th}$ pipe at the $t^{th}$ scheduling period, $T_{e,l,t}$ represents the tail-end temperature of the $l^{th}$ pipe of the heating network at the $t^{th}$ scheduling period, $T_{h,l,t}$ represents the head-end temperature of the $l^{th}$ pipe at the $t^{th}$ scheduling period, $S_n^{out}$ represents a set of all pipe numbers flowing out of a $n^{th}$ node of the heating network, $S_n^{in}$ represents a set of all pipe numbers flowing into the $n^{th}$ node of the heating network, and $Q_{J,n,t}$ represents a heating power of the $n^{th}$ node of the heating network at the $t^{th}$ scheduling period.

(2-6) A coupling constraint between the power grid and the heating network coupled by combined heat and power units in the integrated heat and electricity system is denoted by formulas of:

$$p_{b,t} = \sum_{k=1}^{NK_b} \alpha_{b,t}^k P_b^k, q_{b,t} = \sum_{k=1}^{NK_b} \alpha_{b,t}^k Q_b^k, t=1,2,\ldots,16,$$

where, $p_{b,t}$ represents the active power of the $b^{th}$ combined heat and power unit at the $t^{th}$ scheduling period, $q_{b,t}$ represents the heating power of the $b^{th}$ combined heat and power unit at the $t^{th}$ scheduling period, $(P_b^k, Q_b^k)$ represents the $k^{th}$ vertex of an approximate convex polygon in a running feasible region of the $b^{th}$ combined heat and power unit, $\alpha_{b,t}^k$ represents a $k^{th}$ combination coefficient of the $b^{th}$ combined heat and power unit at the $t^{th}$ scheduling period, $\sum_{k=1}^{NK_b} \alpha_{b,t}^k = 1$, $0 \leq \alpha_{b,t}^k \leq 1$, $NK_b$ represents a number of vertexes of the approximate polygon in the running feasible region of the $b^{th}$ combined heat and power unit, and the approximate polygon in the running feasible region of the combined heat and power unit is obtained from a factory instruction of the combined heat and power unit.

(2-7) A coupling constraint between the power grid and the heating network coupled by a circulating pump in the integrated heat and electricity system is denoted by a formula of:

$$P_{P,t} = \frac{m_{P,t} g H_{P,t}}{10^6 \eta_P}, t = 1, 2, \ldots, 16,$$

where, $P_{P,t}$ represents an active power consumed by the circulating pump at the $t^{th}$ scheduling period, g represents an acceleration of gravity, $\eta_P$ represents an efficiency of the circulating pump, a value of $\eta_P$ ranges from 0 to 1, $m_{P,t}$ represents the mass flow rate that flowing through the circulating pump at the $t^{th}$ scheduling period, and $H_{P,t}$ represents the head of delivery of the circulating pump at the $t^{th}$ scheduling period.

(2-8) A coupling constraint between the power grid and the heating network coupled by a heat pump in the integrated heat and electricity system is denoted by a formula of:

$$P_{hp,t} = C_{hp} Q_{hp,t}, t=1,2,\ldots,16,$$

where, $Q_{hp,t}$ represents a heating power emitted by the heat pump in the integrated heat and electricity system at the $t^{th}$ scheduling period, $P_{hp,t}$ represents an electric power consumed by the heat pump at the $t^{th}$ scheduling period, $C_{hp}$ represents a heat generation efficiency of the heat pump, and $C_{hp}$ is obtained from a factory manual of the heat pump.

(3) Inequality constraints for a steady-state safe operation of the power grid and a heating network in the integrated heat and electricity system may be set, which may include the following.

(3-1) The voltage amplitude $U_{i,t}$ of the $i^{th}$ node of the power grid in the integrated heat and electricity system at the $t^{th}$ scheduling period is between a set upper and lower limits $\underline{U}_i$, $\overline{U}_i$ of safe operating voltage of the power grid, in which, $\underline{U}_i$ is 0.95 times a rated voltage of the $i^{th}$ node, and $\overline{U}_i$ is 1.05 times the rated voltage of the $i^{th}$ node, i.e.:

$$\underline{U}_i \leq U_{i,t} \leq \overline{U}_i, t=1,2,\ldots,16.$$

(3-2) A transmission capacity $S_{l,t}$ of a $l^{th}$ branch of the power grid in the integrated heat and electricity system at the $t^{th}$ scheduling period is less than or equal to a set maximum value $\overline{S}_l$ of the transmission capacity for safe operating of the power grid, i.e.:

$$S_{l,t} \leq \overline{S}_l, t=1,2,\ldots,16.$$

(3-3) Ramp constraints of active powers of combined heat and power units of the power grid of the integrated heat and electricity system are denoted by a formula of:

$$-\Delta p_b^{down} \cdot \Delta t \leq p_{b,t} - p_{b,t-1} \leq \Delta p_b^{up} \cdot \Delta t, t=1,2,\ldots,16,$$

where, $\Delta p_b^{up}$ represents an upward ramp rate of the active power of the $b^{th}$ combined heat and power unit, $\Delta p_b^{down}$ represents a downward ramp rate of the active power of the $b^{th}$ combined heat and power unit, $\Delta p_b^{up}$ and $\Delta p_b^{down}$ are obtained from a factory instruction of the combined heat and power unit, $\Delta t$ represents the interval between two neighboring scheduling periods, $p_{b,t}$ represents the active power of the $b^{th}$ combined heat and power unit at the $t^{th}$ scheduling period, and $p_{b,t-1}$ represents the active power of the $b^{th}$ combined heat and power unit at the $(t-1)^{th}$ scheduling period.

(3-4) Ramp constraints of heating powers of combined heat and power units of the power grid of the integrated heat and electricity system are denoted by a formula of:

$$-\Delta q_b^{down} \cdot \Delta t \leq q_{b,t} - q_{b,t-1} \leq \Delta q_b^{up} \cdot \Delta t, t=1,2,\ldots,16,$$

where, $\Delta q_b^{up}$ represents an upward ramp rate of the heating power of the $b^{th}$ combined heat and power unit, $\Delta q_b^{down}$ represents a downward ramp rate of the heating power of the $b^{th}$ combined heat and power unit, $\Delta q_b^{up}$ and $\Delta q_b^{down}$ are obtained from a factory instruction of the combined heat and power unit, $\Delta t$ represents the interval between two neighboring scheduling periods, $q_{b,t}$ represents the heating power of the $b^{th}$ combined heat and power unit at the $t^{th}$ scheduling period, and $q_{b,t-1}$ represents the heating power of the $b^{th}$ combined heat and power unit at the $(t-1)^{th}$ scheduling period.

(3-5) Ramp constraints of active powers of thermal power units of the power grid of the integrated heat and electricity system are denoted by a formula of:

$$\Delta - p_x^{down} \cdot \Delta t \leq p_{x,t} - p_{x,t-1} \leq \Delta p_x^{up} \cdot \Delta t, t=1,2,\ldots,16,$$

where, $\Delta p_x^{up}$ represents an upward ramp rate of the active power of the $x^{th}$ thermal power unit, $\Delta p_x^{down}$ represents a downward ramp rate of the active power of the $x^{th}$ thermal power unit, $\Delta p_x^{up}$ and $\Delta p_x^{down}$ are obtained from a factory instruction of the thermal power unit, $\Delta t$ represents the interval between two neighboring scheduling periods, $p_{x,t}$ represents the active power of the $x^{th}$ thermal power unit at the $t^{th}$ scheduling period, and $p_{x,t-1}$ represents the active power of the $x^{th}$ thermal power unit at the $(t-1)^{th}$ scheduling period.

(3-6) The active power $p_{b,t}$ of the $b^{th}$ combined heat and power unit at the $t^{th}$ scheduling period is between a set upper and lower limits $\overline{p}_b$ and $\underline{p}_b$ of the active power of the $b^{th}$ combined heat and power unit, i.e., $$\underline{p}_b \leq p_{b,t} \leq \overline{p}_b, t=1,2,\ldots,16.$$

(3-7) The heating power $q_{b,t}$ of the $b^{th}$ combined heat and power unit at the $t^{th}$ scheduling period is between a set upper and lower limits $\overline{q}_b$ and $\underline{q}_b$ of the heating power of the $b^{th}$ combined heat and power unit, i.e., $$\overline{q}_b \leq q_{b,t} \leq \underline{q}_b, t=1,2,\ldots,16.$$

(3-8) The active power $p_{x,t}$ of the $x^{th}$ thermal power unit at the $t^{th}$ scheduling period is between a set upper and lower limits $\underline{p}_x$ and $\overline{p}_x$ of the active power of the $x^{th}$ thermal power unit, i.e., $$\underline{p}_x \leq p_{x,t} \leq \overline{p}_x, t=1,2,\ldots,16.$$

(3-9) The mass flow rate $m_{l,t}$ of the $l^{th}$ pipe at the $t^{th}$ scheduling period is less than or equal to an upper limit $\overline{m}_l$ of the mass flow rate for safe operation of the heating network, i.e.:

$$0 \leq m_{l,t} \leq \overline{m}_l, t=1,2,\ldots,16.$$

(3-10) A return water temperature $T_{i,t}$ of an $i^{th}$ heat exchange station in the heating network at the $t^{th}$ scheduling period is between a set upper and lower limits $\underline{T}$ and $\overline{T}$ of the return water temperature for safe operation of the heating network, i.e.:

$$\underline{T} \leq T_{i,j} \leq \overline{T}, t=1,2,\ldots,16.$$

(4) Using an interior point method, the equation in the above step (1) is used as the objective function, and all equations in the above step (2) and step (3) are used as the constraints, to solve to obtain the active power and the heating power of each combined heat and power unit, the active power of each thermal power unit, the heating power of each heat pump, and the active power consumed by each circulating pump, as the intra-day rolling scheduling scheme of the integrated heat and electricity system, realizing the intra-day rolling scheduling of the integrated heat and electricity system.

The intra-day rolling scheduling method for the integrated heat and electricity system, proposed by the present disclosure, has the characteristics and effects as follows. The method considers the mutual influence of the integrated heat and electricity system and realizes the intra-day rolling scheduling method for the integrated heat and electricity system. This method can continuously modify the current intra-day rolling scheduling plan to obtain a more accurate intra-day rolling scheduling scheme. Compared with independent optimization analysis of the power grid and the heating system, it may get a better scheduling scheme (lower total operating cost), and improve scheduling flexibility. The method can be applied to the formulation of the intra-day rolling scheduling method for the integrated heat and electricity system, which is beneficial to improving the energy efficiency of the integrated heat and electricity system and reducing operating costs.

What is claimed is:

1. An intra-day rolling scheduling method for an integrated heat and electricity system, comprising:

establishing an objective function for scheduling of the integrated heat and electricity system, the objective function aiming to make operating costs of the integrated heat and electricity system to be a minimum, the integrated heat and electricity system comprising combined heat and power units, thermal power units, heat pumps, and circulating pumps;

establishing constraints for a steady-state safe operation of the integrated heat and electricity system; and solving the objective function based on the constraints by an interior point method, to obtain an active power and a heating power of each combined heat and power unit, an active power of each thermal power unit, a heating power of each heat pump, and an active power consumed by each circulating pump, as an intra-day rolling scheduling scheme of the integrated heat and electricity system, wherein the objective function for scheduling of the integrated heat and electricity system is denoted by a formula of:

$$\min \sum_{t=1}^{16} \left( \sum_{b=1}^{N} F(p_{b,t}, q_{b,t}) + \sum_{x=1}^{N_{TU}} F_{TU}(p_{x,t}) \right) \Delta t,$$

where, $p_{b,t}$ represents an active power of a $b^{th}$ combined heat and power unit in the integrated heat and electricity system at a $t^{th}$ scheduling period, $q_{b,t}$ represents a heating power of the $b^{th}$ combined heat and power unit at the $t^{th}$ scheduling period, N represents a number of combined heat and power units, $F(p_{b,t},q_{b,t})$ represents a running cost of the $b^{th}$ combined heat and power unit at the $t^{th}$ scheduling period, $p_{x,t}$ represents an active power of an $x^{th}$ thermal power unit in a power grid in the integrated heat and electricity system at the $t^{th}$ scheduling period, $N_{TU}$ represents a number of thermal power units, $F_{TU}(p_{x,t})$ represents a running cost of the $x^{th}$ thermal power unit, and $\Delta t$ represents an interval between two neighboring scheduling periods.

2. The method of claim 1, wherein the constraints comprise: a power flow constraint of the power grid, a pipe pressure loss constraint of a heating network in the integrated heat and electricity system, a hydraulic characteristic constraint of a circulating pump of the heating network, a pipe heating loss constraint of the heating network, a temperature constraint of a junction node of a plurality of pipes of the heating network, a coupling constraint between the power grid and the heating network coupled by combined heat and power units, a coupling constraint between the power grid and the heating network coupled by the circulating pump, a coupling constraint between the power grid and the heating network coupled by the heat pump, and upper and lower limit constraints.

3. The method of claim 2, wherein the power flow constraint of the power grid is denoted by formulas of:

$$P_{i,t} = U_{i,t} \sum_{j \in i} U_{j,t}(G_{ij}\cos(\theta_{i,t} - \theta_{j,t}) + B_{ij}\sin(\theta_t - \theta_{j,t})),$$

$i, j = 1, 2, \ldots n, t = 1, 2, \ldots, 16$ $$Q_{i,t} = U_{i,t} \sum_{j \in i} U_{j,t}(G_{ij}\sin(\theta_{i,t} - \theta_{j,t}) - B_{ij}\cos(\theta_{i,t} - \theta_{j,t})),$$

$i, j = 1, 2, \ldots n, t = 1, 2, \ldots, 16,$ where, $P_{i,t}$ represents an injected active power of a $i^{th}$ node of the power grid at the $t^{th}$ scheduling period, $Q_{i,t}$ represents an injected reactive power of the $i^{th}$ node of the power grid at the $t^{th}$ scheduling period, $\theta_{i,t}$ represents a voltage phase angle of the $i^{th}$ node at the $t^{th}$ scheduling period, $\theta_{j,t}$ represents a voltage phase angle of the $j^{th}$ node at the $t^{th}$ scheduling period, $U_{i,t}$ represents a voltage amplitude of the $i^{th}$ node at the $t^{th}$ scheduling period, $U_{j,t}$ represents a voltage amplitude of the $j^{th}$ node at the $t^{th}$ scheduling period, $G_{ij}$ represents a real part of an element at $i^{th}$ row and $j^{th}$ column in a node admittance matrix Y of the power grid, $B_{ij}$ represents an imaginary part of the element at $i^{th}$ row and $j^{th}$ column in the node admittance matrix Y of the power grid, and n represents a number of nodes of the power grid.

4. The method of claim 2, wherein the pipe pressure loss constraint of the heating network is denoted by a formula of:

$$\Delta H_{l,t} = S_l m_{l,t} |m_{l,t}|, t=1,2,\ldots,16,$$

where, $\Delta H_{l,t}$ represents a pressure loss of a $l^{th}$ pipe of the heating network at the $t^{th}$ scheduling period, $S_l$ represents a resistance characteristic coefficient, and $m_{l,t}$ represents a mass flow rate of the $l^{th}$ pipe at the $t^{th}$ scheduling period.

5. The method of claim 2, wherein the hydraulic characteristic constraint of a circulating pump of the heating network is denoted by a formula of:

$$H_{P,t} = H_0 - S_p m_{P,t}^2 \, t=1,2,\ldots,16,$$

where, $H_{P,t}$ represents a head of delivery of the circulating pump at the $t^{th}$ scheduling period, $H_0$ represents a static head of delivery of the circulating pump, $S_p$ represents a resistance coefficient of the circulating pump, and $m_{P,t}$ represents a mass flow rate that flowing through the circulating pump at the $t^{th}$ scheduling period.

6. The method of claim 2, wherein the pipe heating loss constraint of the heating network is denoted by a formula of:

$$T_{e,l,t} = (T_{h,l,t} - T_{a,l,t})e^{-\frac{\lambda L_l}{C_p m_{l,t}}} + T_{a,l,t}, \, t = 1, 2, \ldots, 16,$$

where, $T_{e,l,t}$ represents a tail-end temperature of the $l^{th}$ pipe of the heating network at the $t^{th}$ scheduling period, $T_{h,l,t}$ represents a head-end temperature of the $l^{th}$ pipe at the $t^{th}$ scheduling period, $T_{a,l,t}$ represents an ambient temperature of the $l^{th}$ pipe at the $t^{th}$ scheduling period, $m_{l,t}$ represents the mass flow rate of the $l^{th}$ pipe at the $t^{th}$ scheduling period, $L_l$ represents a length of the $l^{th}$ pipe, $C_p$ represents a specific heat capacity of water, $\lambda$ represents a heat transfer coefficient per unit length of the pipe, and e represents a natural logarithm.

7. The method of claim 2, wherein the temperature constraint of the junction node of the plurality of pipes of the heating network is denoted by a formula of:

$$\left(\sum_{l \in S_n^{out}} m_{l,t}\right) T_{h,l,t} = \sum_{l \in S_n^{in}} m_{l,t} T_{e,l,t} - Q_{J,n,t}, t = 1, 2, \ldots, 16,$$

where, $m_{l,t}$ represents a mass flow rate of the $l^{th}$ pipe at the $t^{th}$ scheduling period, $T_{e,l,t}$ represents a tail-end temperature of the $l^{th}$ pipe of the heating network at the $t^{th}$ scheduling period, $T_{h,l,t}$ represents a head-end temperature of the $l^{th}$ pipe at the $t^{th}$ scheduling period, $S_n^{out}$ represents a set of all pipe numbers flowing out of a $n^{th}$ node of the heating network, $S_n^{in}$ represents a set of all pipe numbers flowing into the $n^{th}$ node of the heating network, and $Q_{J,n,t}$ represents a heating power of the $n^{th}$ node of the heating network at the $t^{th}$ scheduling period.

8. The method of claim 2, wherein the coupling constraint between the power grid and the heating network coupled by the combined heat and power units is denoted by formulas of:

$p_{b,t} = \sum_{k=1}^{NK_b} \alpha_{b,t}^k P_b^k, q_{b,t} = \sum_{k=1}^{NK_b} \alpha_{b,t}^k Q_b^k, t=1, 2, \ldots, 16,$ where, $(P_b^k, Q_b^k)$ represents a $k^{th}$ vertex of an approximate convex polygon in a running feasible region of the $b^{th}$ combined heat and power unit, $\alpha_{b,t}^k$ represents a $k^{th}$ combination coefficient of the $b^{th}$ combined heat and power unit at the $t^{th}$ scheduling period, $\sum_{k=1}^{NK_b} \alpha_{b,t}^k = 1$, $0 \le \alpha_{b,t}^k \le 1$, and $NK_b$ represents a number of vertexes of the approximate polygon in the running feasible region of the $b^{th}$ combined heat and power unit.

9. The method of claim 2, wherein the coupling constraint between the power grid and the heating network coupled by the circulating pump is denoted by a formula of:

$$P_{P,t} = \frac{m_{P,t} g H_{P,t}}{10^6 \eta_P}, t = 1, 2, \ldots, 16,$$

where, $P_{P,t}$ represents an active power consumed by the circulating pump at the $t^{th}$ scheduling period, g represents an acceleration of gravity, $\eta_P$, represents an efficiency of the circulating pump, $m_{P,t}$ represents a mass flow rate that flowing through the circulating pump at the $t^{th}$ scheduling period, and $H_{P,t}$ represents a head of delivery of the circulating pump at the $t^{th}$ scheduling period.

10. The method of claim 2, wherein the coupling constraint between the power grid and the heating network coupled by the heat pump is denoted by a formula of:

$P_{hp,t} = C_{hp} Q_{hp,t}, t=1,2,\ldots,16,$ where, $Q_{hp,t}$ represents a heating power emitted by the heat pump at the $t^{th}$ scheduling period, $P_{hp,t}$ represents an electric power consumed by the heat pump at the $t^{th}$ scheduling period, and $C_{hp}$ represents a heat generation efficiency of the heat pump.

11. The method of claim 3, wherein upper and lower limit constraints comprise:

$\underline{U}_i \le U_{i,t} \le \overline{U}_i, t=1, 2, \ldots, 16$, where, $\underline{U}_i$ represents an upper limit for safe operating voltage of the $i^{th}$ node, and $\overline{U}_i$ represents a lower limit for safe operating voltage of the $i^{th}$ node;

$S_{l,t} \le \overline{S}_l, t=1, 2, \ldots, 16$, where, $S_{l,t}$ represents a transmission capacity of a $l^{th}$ branch of the power grid, and $\overline{S}_l$ represents a maximum transmission capacity of the power grid;

$-\Delta p_b^{down} \cdot \Delta t \le p_{b,t} - p_{b,t-1} \le \Delta p_b^{up} \cdot \Delta t$, t=1, 2, \ldots, 16, where, $\Delta p_b^{up}$ represents an upward ramp rate of the active power of the $b^{th}$ combined heat and power unit, $\Delta p_b^{down}$ represents a downward ramp rate of the active power of the $b^{th}$ combined heat and power unit, and $p_{b,t-1}$ represents an active power of the $b^{th}$ combined heat and power unit at the $(t-1)^{th}$ scheduling period;

$-\Delta q_b^{down} \cdot \Delta t \le q_{b,t} - q_{b,t-1} \le \Delta q_b^{up} \cdot \Delta t$, t=1, 2, \ldots, 16, where, $\Delta q_b^{up}$ represents an upward ramp rate of the heating power of the $b^{th}$ combined heat and power unit, $\Delta q_b^{down}$ represents a downward ramp rate of the heating power of the $b^{th}$ combined heat and power unit, and $q_{b,t-1}$ represents a heating power of the $b^{th}$ combined heat and power unit at the $(t-1)^{th}$ scheduling period;

$-\Delta p_x^{down} \cdot \Delta t \le p_{x,t} - p_{x,t-1} \le \Delta p_x^{up} \cdot \Delta t$, t=1, 2, \ldots, 16, where, $\Delta p_x^{up}$ represents an upward ramp rate of the active power of the $x^{th}$ thermal power unit, $\Delta p_x^{down}$ represents a downward ramp rate of the active power of the $x^{th}$ thermal power unit, and $p_{x,t-1}$ represents an active power of the $x^{th}$ thermal power unit at the $(t-1)^{th}$ scheduling period;

$\underline{p}_b \le p_{b,t} \le \overline{p}_b, t=1, 2, \ldots, 16$, where, $\overline{p}_b$ represents an upper limit of the active power of the $b^{th}$ combined heat and power unit and $\underline{p}_b$ represents a lower limit of the active power of the $b^{th}$ combined heat and power unit;

$\underline{q}_b \le q_{b,t} \le \overline{q}_b, t=1, 2, \ldots, 16$, where, $\overline{q}_b$ represents an upper limit of the heating power of the $b^{th}$ combined heat and power unit and $\underline{q}_b$ represents a lower limit of the heating power of the $b^{th}$ combined heat and power unit; and $\underline{p}_x \le p_{x,t} \le \overline{p}_x, t=1, 2, \ldots, 16$, wherein, $\underline{p}_x$ represents an upper limit of the active power of the $x^{th}$ thermal power unit and $\overline{p}_x$ represents a lower limit of the active power of the $x^{th}$ thermal power unit.

12. The method of claim 4, wherein upper and lower limit constraints comprise:

$0 \le m_{l,t} \le \overline{m}_l, t=1, 2, \ldots, 16$, where, $\overline{m}_l$ represents an upper limit of the mass flow rate of the heating network; and $\underline{T} \le T_{i,t} \le \overline{T}, t=1, 2, \ldots, 16$, where, $T_{i,t}$ represents a return water temperature of an $i^{th}$ heat exchange station in the heating network at the $t^{th}$ scheduling period, $\overline{T}$ represents an upper limit of the return water temperature of the heating network, and $\underline{T}$ represents a lower limit of the return water temperature of the heating network.

* * * * *